US011249481B2

(12) United States Patent
Kline et al.

(10) Patent No.: US 11,249,481 B2
(45) Date of Patent: Feb. 15, 2022

(54) WATERBORNE PARCEL TRANSPORT

(71) Applicant: INTERNATIONAL BUSINESS MACHINES CORPORATION, Armonk, NY (US)

(72) Inventors: Eric Vance Kline, Rochester, MN (US); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/577,014

(22) Filed: Sep. 20, 2019

(65) Prior Publication Data

US 2021/0089035 A1 Mar. 25, 2021

(51) Int. Cl.
| | |
|---|---|
| *G05D 1/02* | (2020.01) |
| *G05D 1/00* | (2006.01) |
| *B63B 27/32* | (2006.01) |
| *G06K 19/07* | (2006.01) |
| *G06K 7/10* | (2006.01) |
| *B64C 39/02* | (2006.01) |

(52) U.S. Cl.
CPC ........... *G05D 1/0206* (2013.01); *B63B 27/32* (2013.01); *B64C 39/024* (2013.01); *G05D 1/0088* (2013.01); *G06K 7/10376* (2013.01); *G06K 19/0723* (2013.01); *B64C 2201/128* (2013.01)

(58) Field of Classification Search
CPC .................................................. G05D 1/0206
See application file for complete search history.

(56) References Cited

U.S. PATENT DOCUMENTS

| | | | |
|---|---|---|---|
| 6,269,763 B1 | 8/2001 | Woodland | |
| 6,354,235 B1 | 3/2002 | Davies | |

(Continued)

FOREIGN PATENT DOCUMENTS

| | | | | |
|---|---|---|---|---|
| CN | 109071014 | * | 5/2021 | |
| JP | 6622291 B2 | * | 12/2019 | ............. G01S 19/42 |
| WO | WO-2017068578 A1 | * | 4/2017 | ............... B63C 7/16 |

OTHER PUBLICATIONS

Internet advertisement for Gladius underwater drone, located at https://www.indiegogo.com/projects/gladius-submersible-underwater-drone-technology#/. Date of internet publication May 1, 2018.
YouTube Internet new underwater drone demonstration video, located at https://www.youtube.com/watch?v=FC9EJhs0pc0, published Nov. 13, 2015 by Rutgers Today.

(Continued)

*Primary Examiner* — Jean Paul Cass
(74) *Attorney, Agent, or Firm* — Gregory M. Nordstrom (57) ABSTRACT

A method for transporting a parcel comprises a marine unmanned vehicle (MUMV) receiving a waterproof tote, coupling the tote to a tether, and towing the tether and the tote, with the tether floating on the transport waterway and the tote immersed in the the transport waterway, to a delivery location. The method can include an MUMV receiving the tote from, and/or delivering the tote to, an aerial vehicle. An unmanned water transport system (UWTS) comprises an MUMV, a floating tether, and a waterproof tote containing a parcel for transport on a transport waterway. The MUMV and tether are configured to tow the tether, with the tether floating on the transport waterway, and the tote coupled to the tether and immersed in the water of the transport waterway, to transport the tote from a source location to a delivery location on the transport waterway. The UWTS can perform the method.

20 Claims, 7 Drawing Sheets

(56) References Cited

U.S. PATENT DOCUMENTS

| | | | |
|---|---|---|---|
| 7,506,606 B2* | 3/2009 | Murphy | B63B 21/04 |
| | | | 114/242 |
| 9,205,910 B1* | 12/2015 | Campbell | B64C 1/0009 |
| 9,524,646 B2 | 12/2016 | Hine | |
| 9,561,852 B1 | 2/2017 | Beaman et al. | |
| 9,646,502 B1* | 5/2017 | Gentry | G08G 5/0013 |
| 10,308,360 B2* | 6/2019 | Sopper | B65D 81/00 |
| 10,410,532 B1* | 9/2019 | Myr | G08G 5/006 |
| 2015/0353199 A1* | 12/2015 | Campbell | B64D 9/003 |
| | | | 414/812 |
| 2016/0147223 A1 | 5/2016 | Edwards et al. | |
| 2017/0293302 A1 | 10/2017 | Johnson | |
| 2020/0310408 A1* | 10/2020 | Carper | G05D 1/101 |

OTHER PUBLICATIONS

SwellPro Internet waterproof Splash drone demonstration video, located at https://nofilmschool.com/2017/04/these-waterproof-drones-will-let-you-shoot-underwater, published Apr. 21, 2017 by NONETWORK, LLC.

Internet demonstration video of underwater BIKI drone, David Ibewkwe, located at https://www.businessinsider.com/underwater-drone-swims-fish-record-4k-video-camera-biki-robot-robosea-2017-5?IR=T, published May 24, 2017 by Business Insider.

R. Matheson, "Fleet of autonomous boats could service some cities, reducing road traffic." http://news.mit.edu/2018/fleet-autonomous-boats-service-cities-reducing-road-traffic-0523, May 23, 2018.

I. O'Hara, "Self-assembly of a swarm of autonomous boats into floating structures," 2014 IEEE International Conference on Robotics and Automation (ICRA), Hong Kong, 2014, pp. 1234-1240.

* cited by examiner

WATERBORNE PARCEL TRANSPORT

BACKGROUND

The present disclosure relates to transporting goods and/or materials, and more specifically, to transporting goods and/or materials on waterways.

SUMMARY

According to embodiments of the present disclosure (hereinafter, "embodiments"), a method for transporting parcels comprises an unmanned marine vehicle (MUMV) receiving a waterproof tote containing a parcel for transport. The method includes coupling the tote to a tether, with the floating on the waterway, and the MUMV towing the tether to transport the tote, on the transport waterway from a source location to a delivery location, with the tote immersed in the transport waterway. In some embodiments of the method, the tether can comprise net and transporting the tote can comprise towing the tether with the tote contained in the net.

In embodiments, one or both of the tote and the parcel can include an identification (ID) tag. The ID tag can be electronically and/or visually readable and can identify one or both of the tote and the parcel. In embodiments of the method, the MUMV can receive the tote, at the source location, from an aerial unmanned vehicle (AUMV), and/or an AUMV can receive thea tote from the MUMV at the delivery location.

Additionally, in embodiments of the method, the method can include coupling a second MUMV to the tether and both MUMVs towing the tether. In an embodiment, the method can include decoupling the second MUMV from the tether in response to the combination of the first and the second MUMV having more power, in combination, than required to tow the tether with the tote attached.

In embodiments, the method can include decoupling the first or the second MUMV from the tether in response to a condition indicating a failure condition of the first or second MUMV. In some embodiments, the method can include coupling a third MUMV to tether in response to decoupling one of the first or second MUMVs.

Embodiments can comprise an unmanned water transport system (UWTS) that can perform the method. In embodiments, the UWTS includes one or more MUMVs configured to couple to a tether configured to float on the water of the transport waterway, and a waterproof tote, containing a parcel, configured to couple to the tether. The MUMV and the tether are configured to transport the tote on the transport waterway, from a source location to a delivery location, by towing the tether with the tether floating on the transport waterway and the waterproof tote coupled to the tether and immersed in water of the transport waterway. The waterproof tote, and/or the parcel contained within a waterproof tote, can include an ID tag, and the ID tag can be electronically and/or visually readable.

In an embodiment, a UWTS can further include an AUMV, and the AUMV can be configured to deliver a tote to the MUMV at the source location, and/or retrieve a tote from the MUMV at the deliver location. A UWTS can include a control center. The control center can receive a message indicating that the a plurality of MUMVs, coupled to the tether, has more power than required to tow the tether and the tote. In response, the control center can be configured to direct one of the plurality of MUMVs to de-couple from the tether. A control center can receive a message indicating that one or more MUMVs towing the tether have insufficient power to tow the tether and the tote, and in response the control center can direct an additional MUMV to a location of the MUMV(s), and the additional MUMV can couple to the tether to tow the tether and the tote.

In an embodiment, a control center can receive a message indicating that an MUMV, among a plurality of MUMVs coupled to the tether to tow the tether and the tote, has a failure condition. In response to receiving the message, the control center direct an alternative MUMV to a location of the MUMV(s). The failing MUMV can decouple from the tether and the alternative MUMV can couple to the tether to tow the tether and the tote.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to transporting goods by waterborne vessels, more particular aspects relate to transporting goods by unmanned waterborne vessels. While the present disclosure is not necessarily limited to such applications, various aspects of the disclosure may be appreciated through a discussion of various examples using this context.

Waterways have been used throughout human history to transport goods (e.g., commercial products) between a source location (e.g., a loading dock for transporting goods) and a destination location (e.g., a loading dock for receiving goods). For purposes of illustrating the disclosure, but not intended to limit embodiments of the disclosure (hereinafter, "embodiments"), "goods" can be any type of material and/or product (e.g., a manufactured, agricultural, or consumer material or product), whether commercial or otherwise, that is subject to transport from any particular source location to any particular destination location (or, multiple source/destination location combinations).

Many source locations—such as manufacturing, packaging, and/or supply locations for goods—and destination locations—such as fulfillment centers for goods, or customer delivery locations—are geographically proximate to, and/or interconnected by, "transport waterways", such as canals, lakes, streams or rivers, seas or oceans, banks or coastlines, or combinations thereof. Such source and destination locations can benefit from transport of goods within, or along, transport waterways.

Commonly, goods are, or can be, contained in a package, or "parcel", of some kind, such as a shipping or display package (e.g., a cardboard or plastic product package). Accordingly, but not intended to limit embodiments, as used herein "parcel" refers broadly to any form of package for encapsulating one or more goods for display and/or transport, as well as to any type of good itself for transport, whether or not that good is encapsulated in a parcel per se.

Conventional waterborne transport of parcels commonly aggregates parcels into cargo holds, and/or large shipping containers, borne by large commercial marine transport vessels, such as barges and freighters. However, utilizing modern computing and/or communications technologies, various types of vehicles and vessels can operate as "unmanned", without direct human presence aboard such vehicles or vessels. Additionally, unmanned vehicles and/or vessels can, in some instances, operate autonomously, utilizing computerized controls for determining transportation logistics and/or maneuvering while transporting goods. As used herein, except where otherwise qualified more particularly, "UMV" refers interchangeably to any form of vehicle or vessel that can operate as unmanned, whether or not that vehicle or vessel requires human operation or, alternatively, is partially, or fully, autonomous.

Marine UMVs (hereinafter, MUMVs") and aerial UMVs (hereinafter, AUMVs") are examples of UMVs that can be utilized in an unmanned water transport system (hereinafter, "UWTS") to transport parcels on a transport waterway. In embodiments, MUMVs in a UWTS can take advantage of the buoyancy and low-drag properties of water to transport parcels on a transport waterway. For example, in embodiments a waterproof "tote" can contain one or more individual parcels, and the waterproof totes can float in a transport waterway as part of an "unmanned water transport train" (hereinafter, "UWTT") to transport the parcels, along the waterway, between two or more locations (e.g., a source and a destination location).

In embodiments, a UWTT, can comprise one or more MUMVs configured to transport one or more waterproof totes. Within a UWTS, the MUMV(s) in a UWTT can maneuver on a transport waterway to transport the totes in the UWTT along the transport waterway. As will be shown by examples of the disclosure, but not intended to limit embodiments, a UWTT, in an embodiment, can be configured to transport totes on a transport waterway by a variety of means, such as in cargo holds of MUMVs, by towing totes attached tethers, by towing totes on a cargo net, and/or "herding" totes in a transport waterway. In embodiments, a UWTS can further utilize AUMVs to deliver parcels to, or retrieve parcels from, a UWTT before, during, or after transport of the parcels between locations on a transport waterway.

Figure 1A:
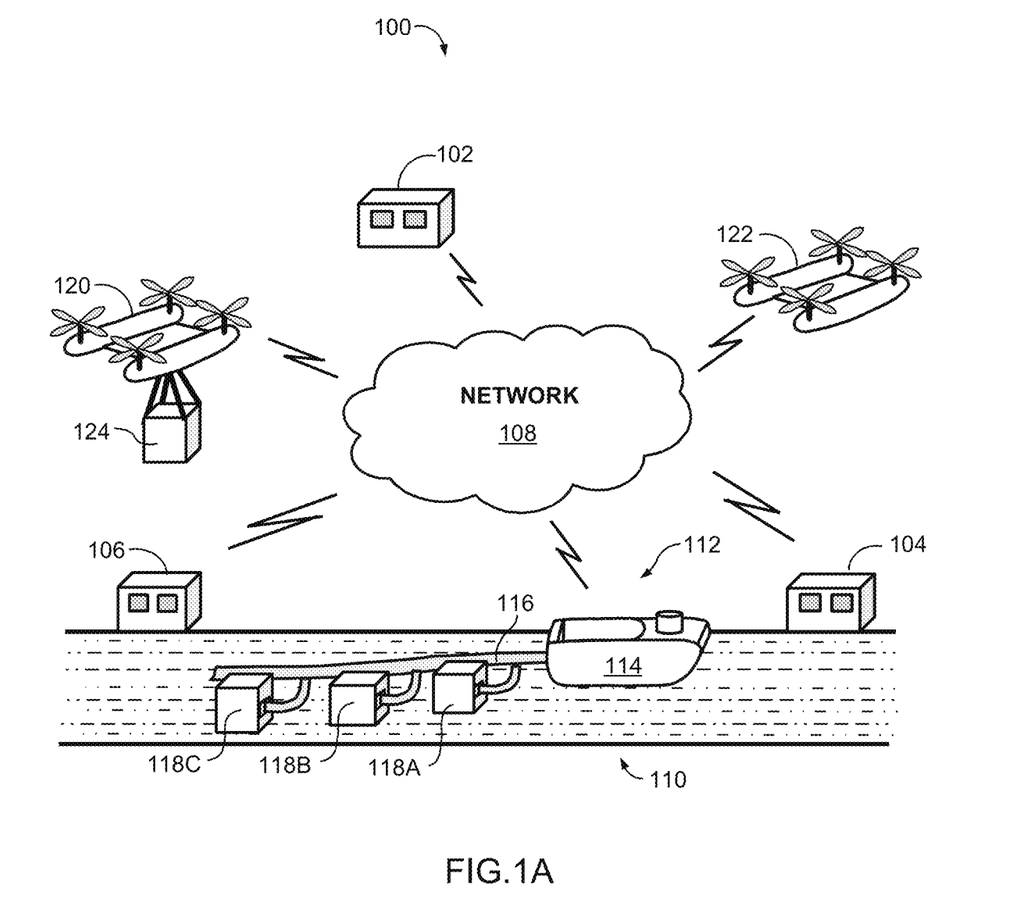
FIG. 1A illustrates an example unmanned water transport system, according to aspects of the disclosure.

FIG. 1A depicts example UWTS 100 comprising control center 102; AUMVs 120 and 122; UWTT 112 comprising MUMV 114 connected by tether 116 to waterproof totes 118A, 118B, and 118C (collectively, "totes 118"); and network 108. UWTT 112 can transport totes 118 (e.g., by MUMV 114 towing tether 116 with totes 118 attached) from source location 106 to destination location 104 on transport waterway 110. While not shown in FIG. 1A, it would be apparent to one of ordinary skill in the art that, in an embodiment, a UWTT, such as 112, can comprise a plurality of MUMVs having tethers, such as 116, to attach totes, and that the plurality of MUMVs can collectively transport the totes on a transport waterway, such as 110.

In embodiments totes (as waterproof) can be submerged, partially or wholly, in a transport waterway upon delivery to, transport in, or retrieval from a UWTT. MUMVs in a UWTT can maneuver, and/or transport, the totes in the UWTT with the totes submerged in the transport waterway. Using the example of FIG. 1A, in an embodiment, totes, such as 118, can be submerged in a transport waterway, such as 110, upon delivery to a UWTT, such as 112. MUMVs in a UWTT can transport totes submerged in a waterway, such as MUMV 114 in UWTT 112 towing tether 116 with totes 118 submerged in transport waterway 110. Totes submerged in a waterway, such as totes among totes 118, can be retrieved from a UWTT while submerged in a transport waterway, such as 110.

In an embodiment, network 108 can facilitate communications (e.g., as shown in FIG. 1A, wirelessly) among locations 106 and 104, control center 102, MUMV 114, and AUMVs 120 and 122. In embodiments, source location 106 can be, for example, a supply location, such as a warehouse, or a loading dock, and destination location can be, for example, a delivery location, such as a product fulfillment center, or a customer location to receive one or more parcels in totes 118.

A control center of a UWTS, in an embodiment, can manage logistics of transporting parcels between two locations on a transport waterway. For example, in embodiments a control center can direct MUMV(s) to navigate on a transport waterway to a particular source location, to form a UWTT comprising one or more MUMVs to transport totes to a particular destination location. Using FIG. 1A to illustrate, control center 102 can direct MUMV 114 to navigate on waterway 110 to source location 106, to configure totes 118 in UWTT 112 (on waterway 110), and/or to transport parcels 118 between locations 106 and 104 on waterway 110.

In embodiments, a control center of a UWTS can direct delivery of parcels (and/or, waterproof totes) to a UWTT, and/or to retrieve parcels (and/or, waterproof totes) from a UWTT. Using, again, FIG. 1A to illustrate, control center 102 can direct AUMV 120 to deliver parcel 124 to UWTT 112, and/or direct AUMV 122 to retrieve one or more of totes 118 from UWTT 112. In an embodiment, to manage transport logistics a control center of a UWTS, such as 102, can utilize a network, such as 108, to communicate with MUMVs in a UWTT, such as 114, and/or AUMVs, such as 120 and/or 122, of parcels 124. In embodiments, network 108 can be a wireless network (e.g., a radio or WIFI network), and can include a wired network (e.g., telecommunication "land lines") between elements of a UWTS, such as a wired network connecting wireless communications with locations 106 and 104.

Figure 1B:
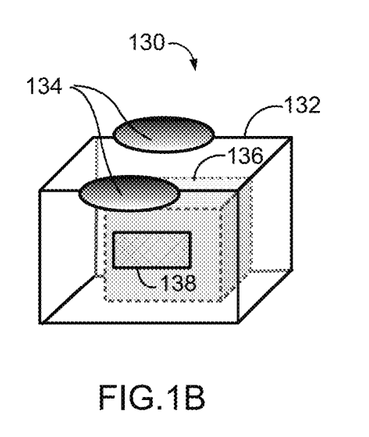
FIG. 1B illustrates an example of waterproof tote, according to aspects of the disclosure.
Figure 1C:
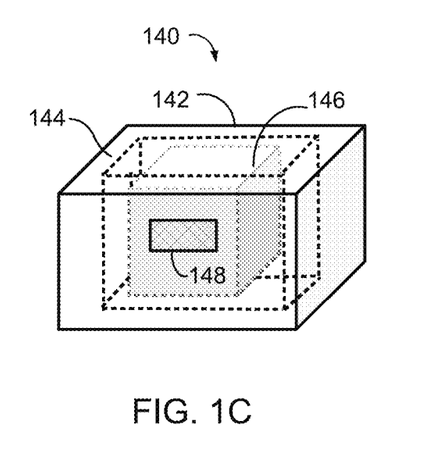
FIG. 1C illustrates an alternative example of a waterproof tote, according to aspects of the disclosure.

As just described, in embodiments a tote can encapsulate a parcel. Such a tote can, in embodiments, protect a parcel from water damage, and/or allow a parcel to be partially, or wholly, immersed in a waterway for transport of the parcel. FIGS. 1B and 1C illustrate example waterproof totes that can be utilized, in embodiments, to encapsulate a parcel for transport in a UWTT. As used herein, but not intended to limit embodiments, "tote" refers to any form of container for a parcel (or, in some embodiments, a parcel itself, having properties of a tote described herein) that provides a waterproof encapsulation of a parcel (or, a good for transport) and is configured for delivery to, and/or retrieval from, a UWTT.

FIG. 1B illustrates example tote 130 comprising housing 132, which can, in an embodiment, encapsulate a parcel within tote 130, such as parcel 136 in FIG. 1B, and can provide a waterproof enclosure for the parcel. In embodiments, tote 130 can be configured for delivery to, or retrieval from (e.g., using an AUMV, such as 120 or 122 in FIG. 1A), a UWTT (e.g., 112 in FIG. 1A).

As previously described in reference to FIG. 1A, as waterproof, totes can be submerged in a transport waterway upon delivery to, transport in, or retrieval from a UWTT. Embodiments can, optionally, integrate into or, alternatively, attach to a tote one or more buoyancy-assist devices, which can increase buoyancy of a tote submerged in a transport waterway. In the example of FIG. 1B, tote 130 further comprises floats 134, which can be, in an embodiment, buoyancy-assist devices to increase the buoyancy of tote 130. In embodiments, buoyancy-assist devices, such as floats 134, can be of a particular size, corresponding to a particular amount of water to displace, to increase the buoyancy of a tote, such as 130, when the tote is immersed in a transport waterway (such as 110 in FIG. 1A). In an embodiment, buoyancy-assist devices, such as floats 134, can be rigid and provide a fixed amount of buoyancy for a tote, or, alternatively, can be inflatable to provide an adjustable buoyancy for a tote.

While FIG. 1B depicts tote 130 comprising two floats (134), in embodiments, a tote need not have a plurality of floats and can, alternatively, include a single float, and a float can be of any geometry suitable to the design, and/or buoyancy requirements, of a tote corresponding to application of the tote in an embodiment. Further, an embodiment can include buoyancy-assist devices, such as floats 134, as a fixed or, alternatively, as a removable, component of a tote, such as 130.

It can be advantageous, in an embodiment, to identify a parcel contained in a tote (and/or, a tote itself). Accordingly, a parcel (and/or a tote) can, in an embodiment, optionally include an identification (ID) tag to identify the parcel (and/or a tote). Such an ID tag can serve, for example, to identify a parcel (and/or tote) to retrieve from a UWTT (e.g., to deliver the parcel from a UWTT to a destination location, such as a customer location, or to deliver a tote form a destination location to a source location, or to another destination location).

To illustrate, FIG. 1B depicts example parcel 136 including optional ID tag 138, which can be readable through a housing of tote, such as housing 132 of tote 130. In embodiments, such an ID tag can be, for example, an electronically-readable ID tag, such as a Radio-Frequency Identification (RFID) tag. In an alternative embodiment, an ID tag can be a visually-readable ID tag and a housing of a tote, such as 132, can include a transparent surface, or window (not shown in FIG. 1B), through which an ID tag (such as 138) can be read visually.

FIG. 1C illustrates an alternative example of a tote utilizing a hollow housing as a buoyancy-assist device. In FIG. 1C, tote 140 comprises housing 142 containing parcel 146. In FIG. 1C, housing 142 of tote 140 is shown with hollow chamber 144. In embodiments, a hollow chamber of a housing can be filled with a gas, such as air or helium (or, alternatively, a buoyant solid, such as a foam), to increase the buoyancy of a tote (e.g., to support the tote at, or near, the surface of a transport waterway), such as previously described in reference to floats 134 of FIG. 1B. While not shown in FIG. 1C, in an alternative embodiment hollow interior 144 can incorporate one or more bladders within housing 142, and these bladders can contain a gas (or, alternatively a buoyant solid) to increase the buoyancy of tote 140. As previously described in reference to FIG. 1B, a parcel (and/or tote) can include an ID tag, and, accordingly, FIG. 1C depicts parcel 146 including optional ID tag 148, which can be used, in an embodiment, to identify parcel 146 within tote 140 (or, by implication, tote 140 itself).

While not shown in FIGS. 1B and 1C, in embodiments a tote can include various types of "handles" or "couplings", which can be used to deliver the tote to, or retrieve the tote from, a UWTT. For example, a tote, such as the examples of 130 and/or 140, can include, in embodiments, "docking couplings" that can facilitate, for example, an AUMV attaching to, and/or detaching from, a tote, such as for delivering the tote to, or retrieving the tote from, a UWTT. As used herein, "docking coupling" refers to any form of handle, or coupling, integrated into or, alternatively, attachable to a tote to facilitate delivery of a tote to, and/or retrieval of a tote from, a UWTT, such as, for example, to attach the tote to an AUMV, or other types of machines or vehicles for transporting a tote.

In embodiments, the size (e.g., one or more of length, width, and height dimensions, or overall volume) and/or geometry of a tote, such as 130 or 140 in FIGS. 1B and 1C, respectively, can conform to one of a set of standard tote sizes and/or geometries. Similarly, in an embodiment floats, hollow chambers of a housing, and/or bladders (or, dimensions of a hollow interior of the housing of a tote, such as 140 of FIG. 1C) can conform to a standard size and/or geometry, according to the design and/or application of the tote, a UWTS utilizing a tote, and/or parcels contained within a tote.

Further, it would be apparent to one of ordinary skill in the art that, in embodiments, a parcel can itself comprise a waterproof housing, floats or other buoyancy-assist devices, hollow chambers of a housing, bladders, and/or docking couplings, and need not be contained within a tote such as those illustrated in FIGS. 1B and 1C. Accordingly, as previously described, but not intended to limit embodiments, as used herein "tote" is understood to comprise a parcel itself, a tote containing a parcel, or any combination of a tote and a parcel, consistent with aspects of the disclosure.

Figure 1D:
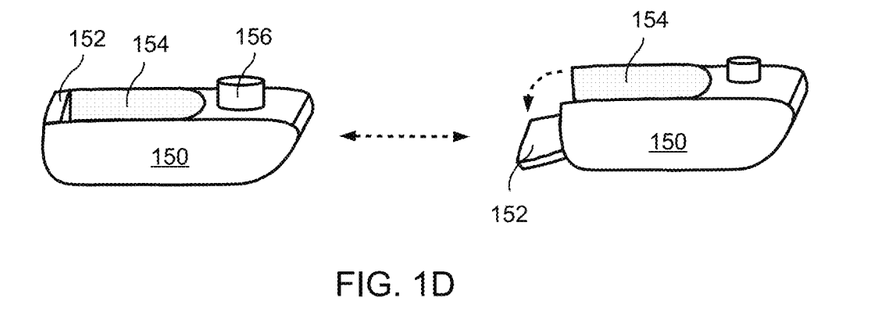
FIG. 1D illustrates a marine unmanned vehicle, according to aspects of the disclosure.

As previously described in reference to FIG. 1A, in embodiments a UWTT can include one or more MUMVs, and the MUMV(s) can navigate on a transport waterway to transport totes, such as the examples of FIGS. 1B and 1C, on the transport waterway. FIG. 1D illustrates example MUMV 150, which, in an embodiment, can be utilized in a UWTT to transport totes on a transport waterway. As shown in FIG. 1D, MUMV 150 comprises cargo hold 154, transom 152, and hardware 156. In embodiments, MUMV 150 can be included in a UWTT to transport totes on a transport waterway. In embodiments, MUMV 150 can be any type and/or size of an unmanned vessel capable of navigating a transport waterway, and capable of maneuvering and/or transporting totes on a transport waterway. In an embodiment, an MUMV can be powered by any variety of marine navigation systems, such as inboard engines, outboard engines, and/or wind-driven sails.

Cargo hold 154, in embodiments, can be designed to hold one or more totes for transport in a UWTT. As further illustrated in FIG. 1D, a cargo hold of an MUMV, such as 150, can be open from above an MUMV (or, alternatively, but not shown in FIG. 1D, accessible through a hatch of the MUMV) and such a cargo hold can facilitate (e.g., by an AUMV) placing a tote into, and/or removing a tote from, an MUMV in a UWTT for transporting the tote.

In embodiments, a transom of an MUMV, such as 152, can open cargo hold 154 to a waterway (e.g., a transport waterway) on which MUMV 150 is navigating. Accordingly, FIG. 1D further illustrates MUMV 150 of FIG. 1D with transom 152 lowered to open cargo hold 154 to a waterway. Opening cargo hold 154 to a waterway, in an embodiment, can facilitate delivery of a tote into, or retrieval of a tote from, cargo hold 154 (e.g., by floating a tote, on the waterway, into cargo hold 154).

In embodiments, UMVs, such as an AUMV or an MUMV, can include various hardware components, such as sensory (e.g., position and/or depth sensors) and/or communications systems (e.g., hardware, software, or a combination thereof). Such hardware can be utilized, as part of a UWTS, to determine operational parameters of an MUMV, AUMV, and/or UWTT (e.g., locations, navigational aids and/or hazards, or logistical parameters) and/or to communicate among UMVs (e.g., AUMVs, and/or MUMVs) and/or a control center, such as a dispatch and/or receiving center at a respective source or destination location of a UWTT.

For example, in an embodiment hardware 156 can include sensing hardware, such as visual, depth, and/or positioning (e.g., Global Positioning System, or "GPS") sensors or receivers, and/or identification hardware, such as Automated Identification System, or "AIS", receivers or transponders. Such sensory hardware can enable MUMV 150, in an embodiment, to determine, for example, position (e.g., GPS coordinates) of MUMV 150 (and/or a UWTT including MUMV 150) on a transport waterway, navigational hazards (e.g., depths below an MUMV, or AIS identifications of other vessels) on a transport waterway, and/or operational status of MUMV 150

Hardware 156 can further include, in an embodiment, communications hardware, such as cellular, Very High Frequency Radio, and/or WIFI communications hardware. In embodiments, such communications hardware can enable UMVs, such as MUMV 150, to communicate amongst each other, and/or with a control center, in a UWTS (and/or UWTT). In embodiments, communications between a UMV (e.g., MUMV 150) and other UMVs, and/or a control center, within a UWTS can a UMV include sending position (e.g., current position, and/or intended destination of a UMV), navigational hazard, and/or UMV operational status to a control center, and/or other UMVs.

In embodiments, communications amongst UMVs and/or a control center, within a UWTS, can include, for example, receiving (e.g., from a UMV, or from a control center) location coordinates, such as GPS coordinates of a source and/or destination locations of a UWTT. In another example, in an embodiment a control center (e.g., 102 in FIG. 1A) can communicate GPS locations to one or more MUMVs in a UWTT (e.g. MUMV 114 in UWTT 112 of FIG. 1A) to direct the MUMV(s) in a UWTT to navigate to a particular location on a transport waterway (e.g., location 104 on waterway 110 in FIG. 1A).

Communications between a UMV and a control center (or, alternatively, among UMVs), in embodiments, can include a control center (or, another UMV) sending commands to a UMV, such as a command to an AUMV to retrieve a tote from, or deliver a tote to, a particular UWTT. In embodiments such a command can include, for example, an identification of the tote (or, a parcel within a tote), such as an ID tag, and an AUMV can detect the ID tag (e.g., electronically read an RFID tag) to verify the tote as the subject of the command. In another example, an AUMV can send a directive to a MUMV to navigate a UWTT to a particular location, and/or slow or accelerate transport to a particular location, to facilitate the AUMV delivering a tote to, and/or retrieving a tote from, the UWTT.

It would be apparent to one of ordinary skill in the art that the types of communications exchanged between a UMV and control center or another UMV, in a UWTS, can include any of a variety of types of informative and/or directive communications, and/or associated communications hardware, as are appropriate to direct and/or monitor operations of UMVs (and/or a UWTT) in a UWTS.

Figure 2A:
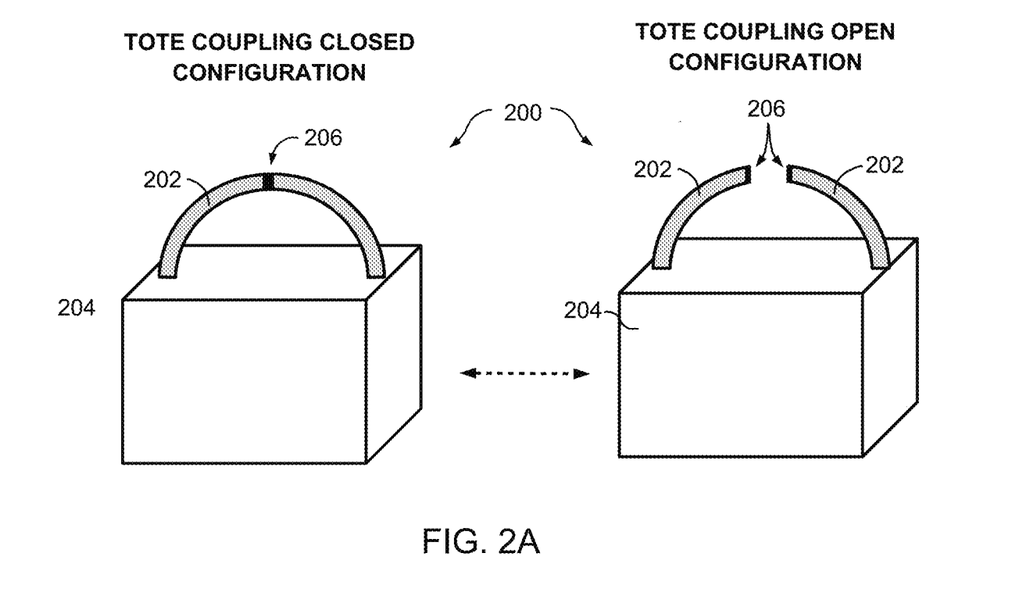
FIG. 2A illustrates an example tote coupling, according to aspects of the disclosure.
Figure 2B:
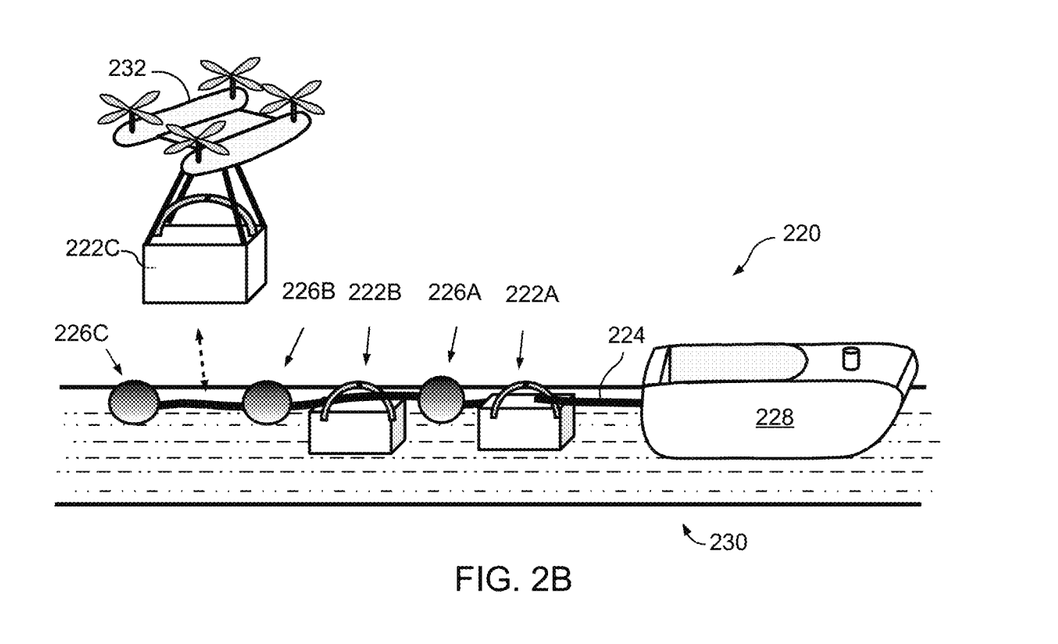
FIG. 2B illustrates an example unmanned water transport train (UWTT), according to aspects of the disclosure.
Figure 3A:
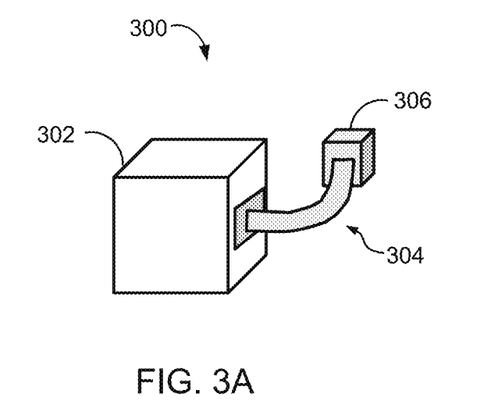
FIG. 3A illustrates an alternative example tote coupling, according to aspects of the disclosure.
Figure 3B:
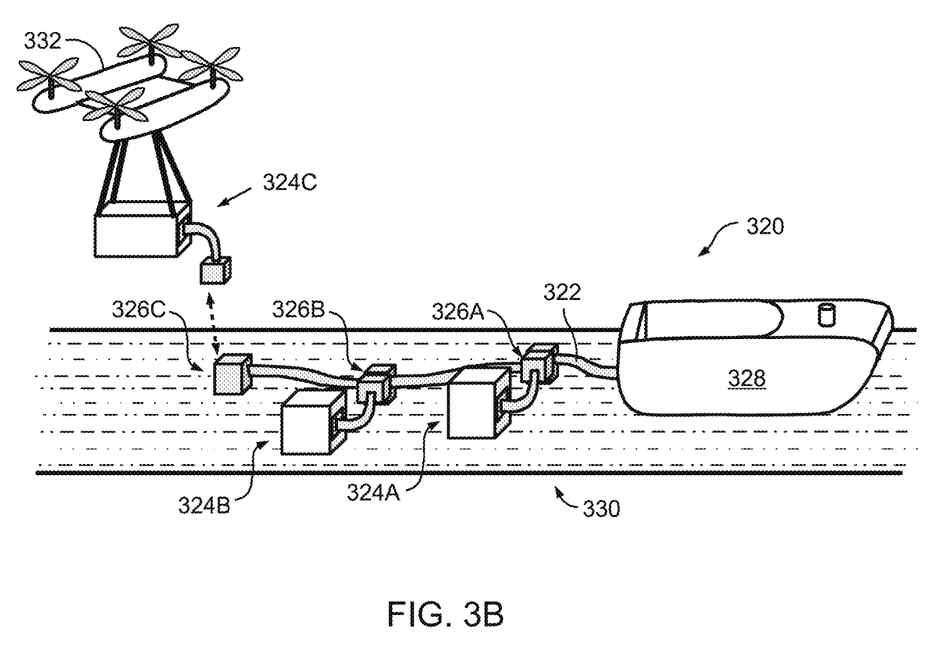
FIG. 3B illustrates an alternative example UWTT, according to aspects of the disclosure.
Figure 4A:
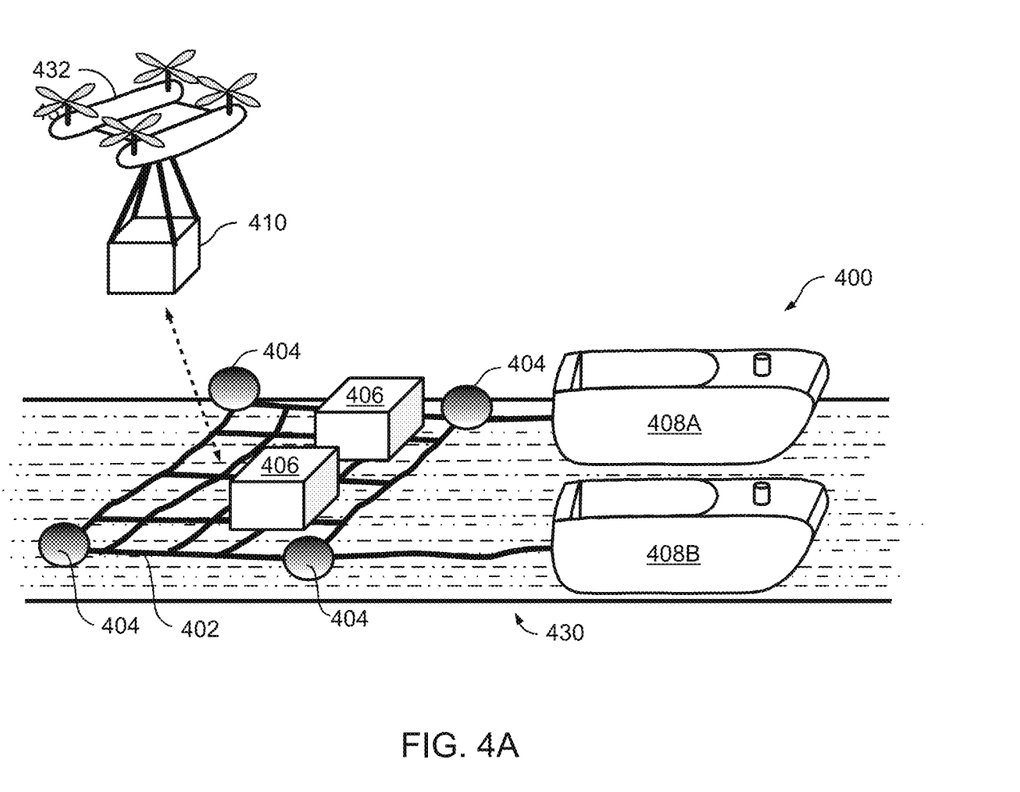
FIG. 4A illustrates a second alternative example UWTT, according to aspects of the disclosure.
Figure 4B:
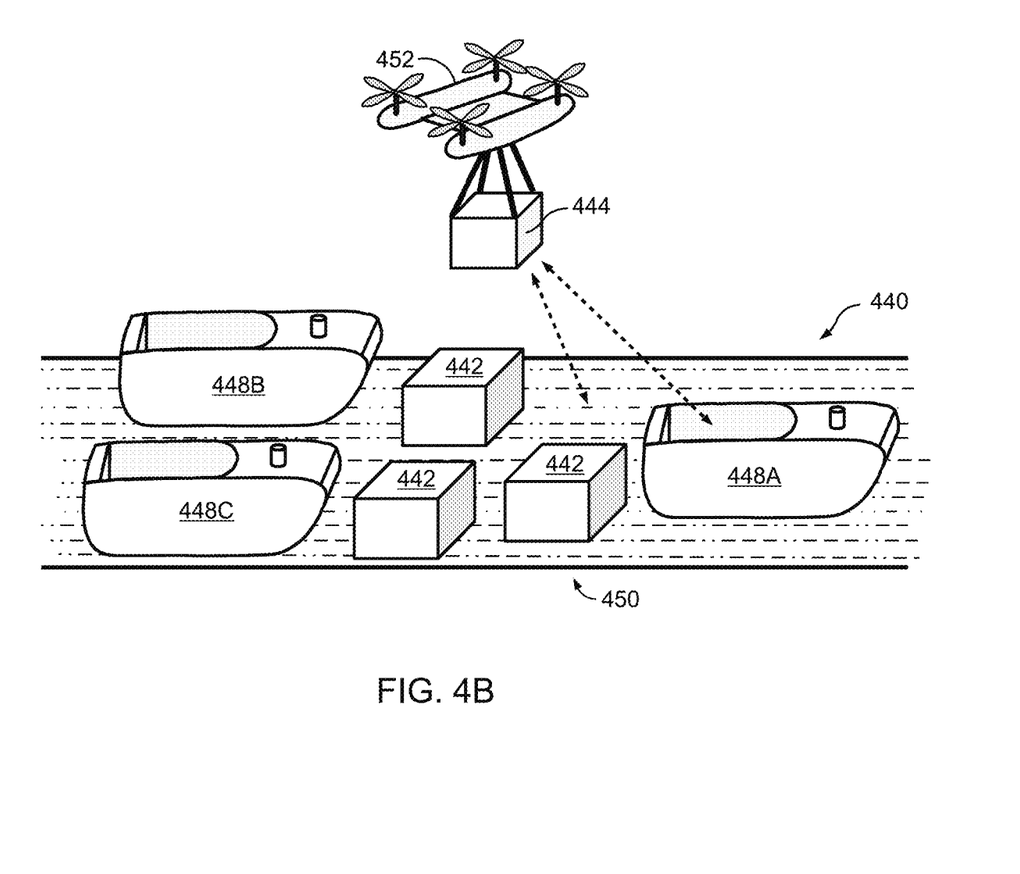
FIG. 4B illustrates a third alternative example UWTT, according to aspects of the disclosure.

In embodiments, a UWTS (and/or UWTT in a UWTS) can employ a variety of means to receive totes, deliver totes, and/or transport totes within a UWTT. While not intending to limit embodiments, FIGS. 2A-4B illustrate various examples of such means. FIGS. 2A and 2B illustrate an example embodiment utilizing a "tether" (e.g., a rope, cable, or chain connected to one or more MUMVs in a UWTT) and mechanical couplers to receive, transport, and/or deliver totes in a UWTT. FIGS. 3A and 3B illustrate an alternative example embodiment utilizing a tether and magnetic couplers to receive, transport, and/or deliver totes in a UWTT. FIG. 4A illustrates another alternative example embodiment utilizing a net to receive, transport, and/or deliver totes in a UWTT, and FIG. 4B illustrates yet another alternative example embodiment utilizing a "herding" method to receive, transport, and/or deliver totes in a UWTT.

In the examples of FIGS. 2A-4B, as previously described and while not explicitly shown in FIGS. 2A-4B, a tote can include docking couplings that can be utilized by, for example, an AUMV, to deliver, transport, and/or retrieve a tote (e.g., to/from a UWTT, a source location, and/or a destination location). While not intended to limit embodiments, for purposes of illustrating the examples of FIGS. 2A-4B it is understood that the totes included in these figures can include such docking coupling mechanisms as are suitable for an AUMV) or, an alternative vehicle or vessel) to transport the tote for delivery to, and/or retrieval from, a UWTT (or, an MUMV included in a UWTT), and/or a source or destination location of the tote and/or a UWTT.

As just described, in embodiments a UWTT can employ a tether to transport a tote in a UWTT, and a tote can include a "tote coupling" to secure the tote to the tether. To illustrate, FIG. 2A depicts example tote 200 comprising tote coupling 202, attached to tote housing 204. FIG. 2A illustrates tote 200 with tote coupling 202 in a closed configuration and an open configuration. In FIG. 2A, tether 202 is depicted at opening at joint 206. In the closed configuration, tote coupling 202 is closed at joint 206 and, in this closed configuration, tether 202 can secure tote 200 to a tether passing between housing 204 and coupling 202.

In the alternative, open configuration, tether 202 is open at joint 206 and, in this open configuration, tote coupling 202 can receive a tether within coupling 202 and subsequently close, at joint 206, to secure tote 200 tether. In an alternative example embodiment (not shown in FIG. 2A), tote coupling 202 can be fixed in the closed configuration of FIG. 2A, and a tether can include a coupling that can, for example, open and close around the closed configuration of tote coupling 202 to attach and detach tote 200 to and from the tether. In embodiments, opening and/or closing a tote coupling (and/or a coupling included in a tether) can be accomplished, for example, using mechanical means (e.g., springs) and/or magnetic means (e.g., a magnetic coupling, such as integrated into joint 206).

FIG. 2B illustrates an example of MUMVs in a UWTT utilizing a tether, with a tote similar to the example of 200 in FIG. 1A, to transport totes on a transport waterway. In FIG. 2B, example UWTT 220 is depicted navigating on transport waterway 230. In embodiments, UWTT 220 can be a UWTT included in a UWTS (not shown in FIG. 2B). In FIG. 2B, UWTT 220 comprises MUMV 228 having tether 224 attached to totes 222A and 222B (collectively, "totes 222"). In an embodiment, tether 224 can be attached to MUMV 228, and totes 222 can be transported by UWTT 220, on waterway 230, by MUMV 228 towing tether 224 with totes 222 attached to tether 224. As previously described, totes 222 can include a tote coupling similar to tote coupling 202 of FIG. 2A to attach and detach totes 222A and/or 222B to and from tether 224.

FIG. 2B further illustrates tether 224 comprising floats 226A, 226B, and 226C (collectively, "floats 226"). In embodiments, floats 226 can buoy tether 224 to position tether 224 at, or near, the surface of transport waterway 230. In embodiments, such floats (or, alternative buoyancy devices) attached to, or integrated into, a tether can facilitate attaching a tote to, or detaching a tote from, the tether.

As previously described in reference to FIG. 1A, in embodiments totes can be submerged, partially or wholly, in a transport waterway and one or more MUMVs in a UWTT can maneuver and/or transport the totes (e.g., tow the totes while attached to a tether) with the totes submerged in the transport waterway. For example, as shown in FIG. 2B, totes 222 can be submerged in waterway 230, attached to tether 224, and MUMV 228 can tow the totes, as attached to tether 224, along transport waterway 230. Floats 226 can buoy tether 224 to assist in attaching totes 222 to tether 224, and/or to assist in buoying one or both of totes 222A and 222B, while attached to tether 224, in waterway 230. While not shown in FIG. 2B, it would be apparent to one of ordinary skill in the art that, in an embodiment, a UWTT, such as 220, can comprise a plurality of MUMVs having tethers, such as 224, to attach totes, and that the plurality of MUMVs can collectively transport the totes on a transport waterway, such as 230.

As previously described, in embodiments a UWTS can include an AUMV, and the AUMV can deliver totes to, and/or retrieve totes from, a UWTT. To illustrate, in FIG. 2B AUMV 232 is shown transporting tote 222C, which can be a tote similar to tote 200 of FIG. 2A and can have a tote coupling to attach to tether 224. In an embodiment, AUMV 232 can be included in a UWTS that includes UWTT 220, and AUMV 232 can deliver tote 222C to, or retrieve tote 222C from, UWTT 220.

For example, a control center of a UWTS (such as 102 in FIG. 1A, but not shown in FIG. 2B) can command AUMV 232 to pickup tote 222C from a particular location (e.g., a supply center) and to transport tote 222C to UWTT 220. As previously described, a tote can include couplings (not shown in FIG. 2B), such as a docking coupling, to facilitate an AUMV, such as 232, transporting a tote, such as 222C. Upon arrival at UWTT 220 with tote 222C, AUMV 232 can deliver tote 222C to UWTT 220, and UWTT 220 can be attach tote 222C to tether 224 at a position on tether 224 not occupied by another tote.

In an embodiment, an AUMV, such as 232, can retrieve a tote from a UWTT, such as 220, while the UWTT is in transit on a transport waterway, and/or upon arrival of a UWTT at a destination. For example, tote 222C can be attached to tether 224 prior to AUMV 232 arriving at UWTT 220 without a tote. UWTT 220 can detach tote 22C from tether 222 and AUMV 232 can retrieve tote 222C for delivery to an alternative location (e.g., a destination, such as a customer location or product fulfillment center, other than a destination of UWTT 220).

Also, while not shown in FIG. 2B, in embodiments an AUMV can deliver a tote into, and/or retrieve a tote from, a cargo hold of an MUMV. Alternatively, in embodiments, an AUMV can deliver a tote to a UWTT by delivering a tote into a transport waterway and a cargo hold of an MUMV (such as cargo hold 154 having opening transom 152 of FIG. 1D) can open to allow the tote to float into the cargo hold for transport. Similarly, in embodiments, an MUMV can open a cargo hold to allow a tote to float from the cargo hold into a transport waterway, and an AUMV can retrieve the tote from the waterway.

To attach a tote to a tether, in embodiments, an MUMV can maneuver a tote delivered into a transport waterway, and/or a tether attached to the MUMV, into a position to attach the tote to a tether. For example, in FIG. 2B a tote coupling of tote 222C, similar to tote coupling 202 of FIG. 2A, can be in an open configuration prior to, or in conjunction with, AUMV releasing tote 222C into transport waterway 230. MUMV 228 can maneuver tether 224 or, alternatively, tote 222C, to position tether 224 within the open tote coupling of tote 222C. In response to placing tether 224 within tote coupling 222C (e.g., by means of a sensor or actuator integrated into tote 222C and/or a tote coupling of tote 222C), the tote coupling can close around tether 224. In embodiments, an MUMV can control opening and closing of a tote coupling. For example, in an embodiment an MUMV can apply electronic and/or mechanical devices to a tote coupling of a tote, such as magnetic solenoids and/or computerized wireless controls, to open and/or close a tote coupling. In an embodiment, an AUMV can additionally, or alternatively, perform attaching and/or detaching a tote from a tether.

FIG. 3A illustrates an alternative example tote and tote coupling to transport totes in a UWTT. In FIG. 3A, tote 300 comprises tote coupling 304 attached to housing 302. Tote coupling 304 includes coupler 306, which can couple tote 300 to a tether in a UWTT. In an embodiment coupler 306 can be, for example, a mechanical device, a magnetic device, or a combination of a mechanical and magnetic device designed to attach to a mating coupler included in a tether of a UWTT.

FIG. 3B illustrates an alternative example of an MUMV in a UWTT utilizing a tether with a tote similar to the example of tote 300 in FIG. 3A. In FIG. 3B, example UWTT 320 is depicted navigating on transport waterway 330 and comprising MUMV 328 attached to tether 322. Tether 322 comprises tether couplings 326A, 326B, and 326C, each of which can mate to a tote coupling of a tote, such as 306 of tote 300 in FIG. 3A. As shown in FIG. 3B, totes 324A and 324B attach to tether 324, in an embodiment, by means of the respective tote couplings connecting to respective tether couplings 326A and 326B of tether 322.

As described in reference to FIG. 3A, in embodiments a tote coupling can include a coupler to mate to a corresponding coupler of a tether. For example, in an embodiment a tote coupling of totes 324A and/or 324B can be, or can include, a magnet and a mating coupler of tether 322 can be a magnetically attractive plate or can be another magnet. Alternatively, a mating coupler of tether 322 can be, or can include a magnet, and a tote coupling of totes 324A and/or 324B can be, or can include, a coupler comprising a magnetically attractive plate or can be another magnet. Attaching and detaching totes 324A and/or 324B to or from tether 322 can comprise, respectively, connecting and disconnecting the magnetic connection between the tote coupling of totes 324A and/or 324B and the mating coupler of tether 322.

In an alternative embodiment, a tote coupling of totes 324A and/or 324B, and a mating coupler of tether 322, can be mechanical couplings that join to each other. Accordingly, attaching and detaching totes 324A and/or 324B to or from tether 322 can comprise, respectively, connecting and disconnecting the mechanical connection between the tote coupling of totes 32A and/or 324B and the mating coupler of tether 322.

In FIG. 3B, UWTT 320 can tow tether 322 to transport, on waterway 330, totes attached to tether 322. In embodiments, UWTT 320 can be a UWTT included in a UWTS (not shown in FIG. 3B). As previously described in reference to FIG. 1A, in embodiments totes can be submerged, partially or wholly, in a transport waterway, and in embodiments such as the example of FIG. 3B, a UWTT, such as 320, can receive, transport, and/or deliver totes, such as 324A or 324B, while submerged in a transport waterway, such as 330.

While not shown in FIG. 3B, in an embodiment tether 322 can include floats, such as floats similar to floats 226 of FIG. 2B, which can maintain a tether, such as 322, at or near the surface of a transport waterway. As described in reference to FIG. 2B, maintaining a tether at or near the surface of a transport waterway can facilitate attaching a tote to, or detaching a tote from, the tether. Additionally, while not shown in FIG. 3B, it would be apparent to one of ordinary skill in the art that, in an embodiment, a UWTT, such as 320, can comprise a plurality of MUMVs having tethers, such as 322, to attach totes, and that the plurality of MUMVs can collectively transport the totes on a transport waterway, such as 330.

As previously described, in embodiments a UWTS can include an AUMV, and an AUMV can deliver totes to, or retrieve totes from, a UWTT, such as shown in FIG. 3B by AUMV 332 transporting tote 324C. In an embodiment, tote 324C can be a tote similar to tote 300 of FIG. 3A, and can have a tote coupling, similar to 304 of FIG. 3A, to attach to (or, detach from) tether 322 at tether coupling 326C of tether 322.

In an embodiment, AUMV 332 can deliver tote 324C to UWTT 320. For example, a control center of a UWTS, such as 102 in FIG. 1A, can command AUMV 332 to deliver tote 324C to UWTT 320. As previously described, a tote can include couplings, such as a docking coupling, to facilitate AUMV 332 to pick up and/or release (i.e., deliver) tote 324C. Upon arrival of AUMV 332 at UWTT 320 with tote 324C, AUMV 332 can deliver tote 324C to UWTT 320, and UWTT 320 can attach tote 324C to tether 322 at tether coupling 326C.

Alternatively, tote 324C can be attached to tether 322 prior to the arrival of AUMV 332 at UWTT 320 and, upon arrival of AUMV 332 at UWTT 320, UWTT 320 can detach tote 324XC from tether 322 and AUMV 332 can retrieve tote 324C and transport tote 324C to an alternative location (e.g., a fulfillment center or customer location). As previously described, in embodiments an AUMV can alternatively deliver a tote into, and/or retrieve a tote from, a cargo hold of an MUMV or, deliver a tote to, o to a transport waterway to float a tote into a cargo hold of an MUMV that can open the cargo hold to the transport waterway.

Also, as previously described, to attach a tote to a tether, in embodiments, an MUMV can maneuver a tote delivered into a transport waterway, and/or a tether attached to the MUMV, into a position to attach the tote to a tether. In the example of FIG. 3B, AUMV can deliver 324C to UWTT 320 and MUMV 328 can maneuver tether 322, tote 324C, or both, into a position such that the tote coupling of tote 324C can mate to a corresponding coupling of tether 322. Alternatively, AUMV can deliver tote 324C to UWTT 320 in a proximity to a tether coupling of tether 322 such that the tote coupling of tote 324C can mate to the coupling of tether 322. To retrieve tote 324C from UWTT 320, upon arrival of AUMV 332 at UWTT 320, MUMV can detach tote 324C from a tote coupling of tote 324C from the tether coupling of tether 322 and AUMV 332 can retrieve tote 324C. In an embodiment, an AUMV can alternatively, or additionally, perform attaching and/or detaching a tote from a tether.

FIGS. 4A and 4B illustrate alternative means of a UWTT transporting totes that do not include a tether to attach the totes. FIG. 4A depicts UWTT 400 comprising MUMVs 408A and 408B (collectively, MUMVs 408) connected to net 402 on transport waterway 430. Net 402 includes floats 404, which can, in an embodiment, provide buoyancy to suspend net 402 at or near the surface of waterway 430. Totes 406 are shown in FIG. 4A suspended on cargo net 402. In embodiments, one or more MUMVs, such as 408A and/or 408B, can tow a cargo net, such as 402, and thereby transport totes, such as 406, on a transport waterway, such as 430. Further, while not shown in FIG. 4A, it would be apparent to one of ordinary skill in the art that, in an embodiment, a UWTT, such as 400, can comprise a plurality of MUMVs connecting to a plurality of nets to transport totes, and the plurality of MUMVs can collectively transport the totes on a transport waterway, such as 430.

FIG. 4A also illustrates AUMV 432 transporting tote 410 to (or, alternatively, from) UWTT 400. In embodiments, an AUMV, such as 432, can deliver a tote, such as 410, to a UWTT, such as 400, or retrieve a tote, such as 406, from a UWTT, such as 400. In an embodiment, delivering a tote to a UWTT utilizing a cargo net, such as the example of UWTT 440, can comprise depositing the tote directly onto the cargo net. In alternative method, delivering a tote to a UWTT utilizing a cargo net, such as 402, can comprise delivering a tote into a transport waterway and floating, or guiding, the tote into position on the cargo net. To illustrate, using the example of FIG. 4A, delivering a tote to UWTT 400 can comprise AUMV 432 depositing tote 410 into waterway 430 and tote 410 floating into a position (e.g., behind one of totes 406) on cargo net 402. One or more of MUMVs 408A and 408B can additionally, or alternatively, guide tote 410, and/or net cargo 402, to position tote 410 on cargo net 402. AUMV can guide cargo net 402 to position tote 410 on cargo net 402.

In an embodiment, retrieving a tote from a UWTT utilizing a cargo net, such as the example of UWTT 440, can comprise removing the tote directly from the cargo net. In an alternative method, retrieving a tote from a UWTT utilizing a cargo net can comprise floating, or guiding, a tote from a position on a cargo net into a transport waterway for retrieval from the transport waterway. Using the example of FIG. 1B to illustrate, retrieving a tote can comprise floating tote 410 from a position (not shown in FIG. 4A) on cargo net 402 into waterway 430, and/or one or more of MUMVs 408A and 408B maneuvering cargo net 402, to position tote 410 in waterway 430, and AUMV 324 retrieving tote 410 from waterway 430.

As previously described, in embodiments totes can be submerged, partially or wholly, in a transport waterway and the totes can float relatively freely in the waterway. Accordingly, in another example embodiment, one or more MUMVs can maneuver (e.g., push in a particular direction), or "herd", the freely floating totes along the transport waterway. To illustrate, FIG. 4B depicts example UWTT 440 comprising MUMVs 448A, 448B, and 448C (collectively, MUMVs 448) herding totes 442, submerged in transport waterway 450. In an embodiment, MUMVs 448 can herd (e.g., by pushing and/or pulling) totes 442 along transport waterway 450. For example, MUMVs 448B and 448C can push totes 442 forward along waterway 450, and/or move alongside one or more of totes 442 to move the totes laterally along waterway 450 (e.g., to constrain the totes to a lateral portion of waterway 450). MUMV 448A can restrain totes among 442 (e.g., block forward progress, and/or push backward on, totes among 44s) from proceeding too quickly, or too far ahead, on waterway 450, and/or can redirect (e.g., turn) totes among 442 while moving on waterway 450.

As previously described, in embodiments an AUMV can deliver totes to, and/or retrieve totes from, a UWTT. In an embodiment utilizing MUMVs to herd totes on a waterway, such as the example of FIG. 4B, an AUMV can deliver a tote to a UWTT by depositing the tote at a position in a transport waterway among a set of other totes already assembled into a UWTT in the waterway or can retrieve a tote from a UWTT by retrieving the tote from the waterway. To illustrate, as shown in FIG. 4B, AUMV 452 can transport tote 444 to UWTT 440 and deliver tote 444 UWTT 440 by depositing the tote at a position in transport waterway 450 among totes 442. Alternatively, in FIG. 4B, tote 444 can have been among totes 442 and AUMV 452 can have retrieved tote 444 from UWTT 440 by retrieving tote 444 from among totes 442 in transport waterway 450.

While not illustrated in the examples of FIGS. 2B, 3B, and 4A, but as previously described with reference to FIG. 1A, in embodiments an AUMV can deliver a tote into, and/or retrieve a tote from, a cargo hold of an MUMV or, alternatively, to a transport waterway to float a tote into a cargo hold of an MUMV that can open the cargo hold to the transport waterway. An AUMV, in alternative embodiments, can retrieve a tote from a UWTT by retrieving the tote from a cargo hold of an MUMV. Alternatively, a cargo hold of an MUMV can open to a waterway, such as in example MUMV 150 of FIG. 1E, a tote can float from the open cargo hold onto the waterway for retrieval by an AUMV. It would be appreciated by one of ordinary skill in the art that the foregoing description of delivering a tote to a cargo hold of an MUMV in a UWTT, and/or removing a tote from a cargo hold of an MUMV in a UWTT, applies equally to the examples of FIGS. 2B, 3B, and 4A.

Additionally, while the foregoing examples of FIGS. 1A, 2B, 3B, and 4B are shown with particular numbers of AUMVs and MUMVs, this is not intended to limit embodiments, and it would be apparent to one of ordinary skill in the art that a UWTT can include any number of MUMVs appropriate for transporting a particular number and/or size of totes (and, the parcels contained therein) or appropriate to the design of a means for the MUMVs to physically constrain and/or maneuver the totes on a transport waterway.

In embodiments, MUMVs and/or AUMVs, such as illustrated in the foregoing examples of FIGS. 1A, 2B, 3B, 4A, and 4B, can include communications devices and can communicate with a source, destination, and/or control location (not shown in FIG. 4A), one or more AUMVs, and/or one or more other MUMVs. As previously described, in reference to FIG. 1A, the communications devices can facilitate coordinating logistics of transporting totes, such as communicating with one or more MUMVs and AUMVs to deliver totes to and assemble into a UWTT; disassembling a UWTT at a destination location; deliver totes to or remove totes from a UWTT in transit; and/or to remove a tote from a UWTT at a destination location for delivery to an alternative destination (e.g., delivery from a destination loading dock to a customer location).

In embodiments, and/or applications of an embodiment, MUMVs, in a UWTT can have insufficient power to transport a set of totes, such as if the weight or number of totes in a UWTT is too great for the MUMV(s) forming a UWTT to transport. In such embodiments, one or more MUMVs in a UWTT can communicate with a control center, one or more AUMVs, and/or one or more other MUMVs, in a UWTS to request deployment of one or more additional MUMVs to transport the totes. Alternatively, In some embodiments, and/or applications of an embodiment, one or more MUMVs in a UWTT can have more power to transport a set of totes than is necessary, and the MUMV(s) can communicate with a control center, one or more AUMVs, and/or one or more other MUMVs, in a UWTS to remove one or more of the MUMVs from a UWTT (e.g., to redeploy the extra MUMV(s) to another UWTT or location).

Figure 5:
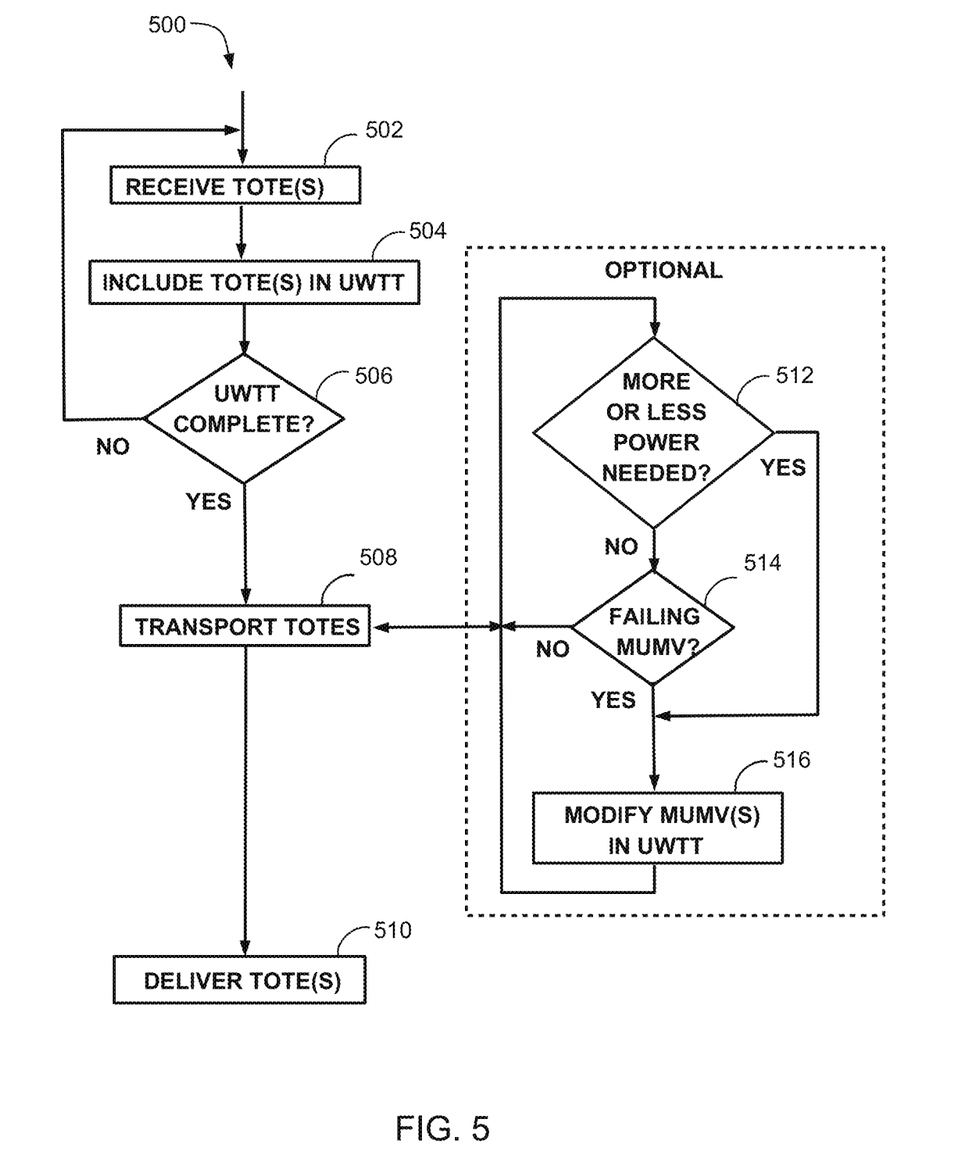
FIG. 5 is a flowchart that illustrates an example method to transport parcels on a transport waterway, according to aspects of the disclosure.

The foregoing examples of FIGS. 1A-4B illustrate various example embodiments of a UWTS, UWTT, MUMV, and waterproof totes. However, embodiments can comprise a method for transporting parcels on a waterway. In some embodiments, a method of transporting parcels in an aerial restricted, and/or roadway restricted, area can comprise a UWTT utilizing MUMVs receiving and transporting a waterproof tote on a transport waterway. Accordingly, FIG. 5 illustrates example method 500 for transporting parcels on a waterway. For purposes of illustrating the method, but not intended to limit embodiments, FIG. 5 is described as using waterproof totes to encapsulate (or, alternatively, comprise) parcels for transport, and as performed by a UWTT comprising one or more MUMVs for transporting the totes on a transport waterway.

In example method 500, at 502 a UWTT receives one more totes at a source, or starting, location on a transport waterway and, at 504, the UWTT includes, and/or assembles, the tote(s) in the UWTT. In embodiments, at 502 a UWTT can receive totes from various delivery equipment and/or vehicles, such as an MUMV, an AUMV, a human worker, and/or a conveyor system, and the totes can be waterproof totes. However, this is not to limit embodiments and it would be apparent to one of ordinary skill in the art that, at 502, a UWTT can receive totes from a variety of means to include totes in a UWTT. As illustrated by the foregoing examples of FIGS. 1A, 2B, 3B, 4A, and 4B, at 504 a UWTT can include, assemble, and/or transport, totes within a UWTT by a variety of means, such as attaching the totes to tethers, placing totes on cargo nets, placing totes in a cargo hold of an MUMV, placing totes in a waterway to herd the totes within a UWTT, and/or any combination of such methods.

At 506, the UWTT determines if the UWTT is complete. In embodiments, determining that the UWTT is complete, at 506, can comprise determining that all totes intended for transport on the transport waterway are assembled in the UWTT. If, at 506, if the UWTT determines that the UWTT is not complete, at 502 the UWTT continues to receive additional totes and/or MUMVs and, at 504, to assemble the additional totes in the UWTT.

In an embodiment, determining that a UWTT is complete, at 506, can comprise determining that there are sufficient MUMVs included in the UWTT to transport the totes (e.g., that the number of MUMVs in the UWTT can provide sufficient power for the cumulative weight of the totes, and/or is of a sufficient number of MUVMs to tether or herd the total number of totes, included in the UWTT).

If, at 506, the UWTT determines that the UWTT is complete, at 508 the UWTT transports the totes on the transport waterway from the source, or starting, location of the UWTT towards a destination location of the UWTT. In embodiments, as previously described, a UWTT source location can be a product, a material, and/or parcel supply location, and/or a UWTT destination location can be product fulfillment center, warehouse, or customer delivery location. Additionally, in embodiments, receiving totes (at 502), and/or including totes in a UWTT (at 504), can comprise a variety of means to move and/or maneuver totes within a UWTT, such as described in the examples of FIGS. 2B, 3B, 4A, and 4B.

As previously described, in embodiments, at 508 totes can be delivered to a UWTT in transit. For example, in an embodiment an AUMV (or, alternatively, another MUMV) can deliver one or more totes to a UWTT, while the UWTT is in transit on the transport waterway, and the totes can be assembled in the UWTT such by methods as described in reference to FIGS. 2B, 3B, 4A, and 4B.

In embodiments, at 508, totes can be retrieved from a UWTT while the UWTT is in transit on the transport waterway (e.g., prior to arrival of the UWTT at a destination location of the UWTT). For example, as previously described, in embodiments an AUMV can arrive at a UWTT in transit and can retrieve one or more totes from a UWTT. In an embodiment an AUMV can retrieve a tote, for example, to deliver the tote to a customer location, such as a residential address of a customer. In embodiments, retrieving a tote from a UWTT can comprise, for example, any or, or any combination of, the methods described in reference to FIGS. 2B, 3B, 4A, and 4B to retrieve a tote from a UWTT.

At 510 of method 500, the UWTT delivers one or more of the totes to a destination location of the UWTT on the transport waterway. Upon arrival at the destination location, in embodiments, at 510 totes delivered to the destination can be disassembled (or otherwise, removed) from the UWTT, such as to deliver the totes from a UWTT to a customer, or to transfer the totes from a UWTT to a fulfillment center or a warehouse, for example. In embodiments, delivering a tote at a destination location of a UWTT can comprise disassembling the tote from the UWTT, such as by maneuvering the totes, and/or maneuvering a tether or cargo net, to disassemble totes from the UWTT. Disassembling totes at a destination location of a UWTT (and/or while a UWTT is in transit on a transport waterway) can be performed, for example, by one or more MUMVs, AUMVs, human workers, and/or a conveyor system.

In embodiments, totes (and/or parcels which can function as a waterproof tote) can be re-usable, such as to transport additional parcels and/or goods in a UWTT. Accordingly, at 510, in embodiments a UWTT can remove a parcel (and/or a good) from a tote and can transport the tote (e.g., by an AUMV, a MUMV, or as included in a UWTT) to an alternative location (e.g., a source location of a UWTT) to transport other parcels and/or goods.

As described in reference to FIGS. 1B and 1C, in embodiments parcels included in a tote, and/or a tote itself, can include an ID tag. Accordingly, in embodiments, operations of method 500 (e.g., 502-510) can include reading an ID tag (e.g., electronically, and/or visually) to identify a parcel and/or a tote. For example, in embodiments identifying a tote, and/or parcel, using an ID tag, can assist in identifying and/or selecting a tote to include in a UWTT, to identify a tote (and/or a parcel) included in a UWTT for retrieval from the UWTT in transit or upon delivery to a UWTT destination location, to identify a tote and/or parcel as included in a UWTT, and/or to identity a tote and/or parcel for re-use.

As described in reference to FIG. 1A, in embodiments operations of method 500, such as 502-510, can include communicating directives, routes, and/or commands between a command center, one ore more AUMVs, a source or destination location of a tote or UWTT, and/or MUMVs included in a UWTT. For example, at 502 a control center can communicate to an AUMV to retrieve one or more totes from a parcel source location (e.g., a supply center) different from a source location of a UWTT and to transport the tote(s) to the UWTT source location for transport within the UWTT on a transport waterway.

In another example, at 506 a control center can communicate with a UWTT (e.g., with one or more MUVMs within a UWTT) that a UWTT is complete and ready to transport totes within the UWTT to a destination location. Such a communication can include an identity of the location (e.g., a GPS coordinate or waypoint) and/or a route on the transport waterway to reach a destination location of the UWTT.

In yet another example, at 508 a control center can communicate with an AUMV to direct it to rendezvous with a UWTT in transit and to retrieve a particular tote, or totes, from the UWTT, and/or to deliver a tote (or, totes) to a UWTT. Such a communication can include, for example, a directive to retrieve a tote and to deliver the tote to an alternative location different from the destination location of the UTWW. Communications from a control center, at 508, can further include a communication with one or more MUMVs in the UWTT to assist in the AUMV retrieving one or more totes, and/or assembling totes in a UWTT.

At 510, for example, communications from a control center can include a communication with one or more MUMVs, one or more AUMVs, and/or other delivery mechanisms and/or vehicles to assist in retrieving totes from a UWTT, transporting totes to a subsequent delivery location (e.g., a warehouse, or customer location, and/or a location for re-use of the tote and/or parcel).

Optionally, methods of an embodiment can include operations such as 512-516, of method 500, to modify the composition of MUMVs included in a UWTT. At optional operation 512, a UWTT can determine if MUMVs included in a UWTT have insufficient power to transport totes included in the UWTT or, alternatively, if MUMVs included in a UWTT have more power than required to transport totes included in the UWTT. An embodiment can perform 512, for example, at or in conjunction with determining at 506 that a UWTT is complete and/or, at 508, while a UWTT is in transit on a transport waterway.

In an embodiment, a UWTT can have insufficient power (and/or too few MUMVVs) among the MUMVs in the UWTT to transport totes included in the UWTT if, for example, a UWTT includes totes having more weight, or greater number, than the combination of MUMVs in the UWTT can transport. In another example, a UWTT can have insufficient power, and/or number of MUMVs, to transport totes included in the UWTT due to conditions on a transport waterway, such as too much current, and/or opposing waves, present such that the combination of MUMVs in a UWTT is insufficient to transport the totes. Accordingly, at 512, if a UWTT determines that MUMVs included in the UWTT have insufficient power and/or, are too few, to transport totes included in the UWTT, at optional operation 516 a UWTT can modify the MUMVs.

In embodiments, a UWTT can, at optional operation 516, modify the UWTT by requesting, and/or including, one or more additional MUMVs to transport the totes. For example, in an embodiment a UWTT (e.g., one or more MUMVs included in the UWTT) can communicate with a control center of a UWTS to coordinate adding MUMVs to a UWTT. Adding MUMVs, in an embodiment, can include adding MUMVs having more power than other MUMVs included in the UWTT, and/or adding a greater number of MUMVs of lesser, or similar, power to MUMVs in the UWTT to achieve sufficient power to transport the totes. Adding MUMVs, in an embodiment, can include adding a greater number of MUMVs to the UWTT to provide additional tethers, cargo nets and/or holds, or herding MUMVs, to transport the number of totes included in the UWTT.

In an embodiment, a UWTT can have more power (and/or more MUMVs) among the MUMVs in the UWTT than needed to transport the totes included in the UWTT. For example, a UWTT can include fewer totes, and/or totes having less cumulative weight, than the combination of MUMVs in a UWTT can transport (e.g., at 508, prior to or during transport of the totes by the UWTT). In another example, conditions on a transport waterway can be (e.g., there can be less current and/or opposing waves present) such that MUMVs in the UWTT comprise more MUMVs than required to transport the totes. In yet another example, MUMVs in a UWTT can number more MUMVs than needed to tether, tow on cargo nets, include in cargo holds, and/or herd the number of totes included in the UWTT.

Accordingly, in an embodiment if a UWTT determines, at 512, that MUMVs included in the UWTT have more power (and/or the number of MUMVs in the UWTT is more than needed) to transport totes included in the UWTT, at 516 a UWTT can modify the MUMVs in the UWTT by removing one or more MUMVs from the UWTT. In embodiments, a UWTT (e.g., one or more MUMVs included in the UWTT) can communicate with a control center of a UWTS to coordinate removal of MUMVs from a UWTT.

If, in lieu of optional operation 512 or, alternatively, if a UWTT determines, at 512, that the UWTT has no more or less power (and/or, no more or fewer MUMVs) than needed to transport the totes included in the UWTT, at optional operation 514 a UWTT can determine if an MUMV in the UWTT has had or, alternatively, can predict, a failing condition of one or more MUMVs (e.g., a failure in propulsion, communications, and/or maneuverability or navigability). If so, at optional operation 516 a UWTT can modify the MUMVs included in the UWTT. For example, at 516, in an embodiment, in response to a UWTT determining, or predicting, at 514, a failure in an MUMV, a UWTT can remove a failing MUMV from the UWTT. In another example, at 516, in an embodiment, in response to a UWTT determining, or predicting, at 514, a failure in an MUMV, a UWTT can request (e.g., from a UWTS, and/or a control center in a UWTS) and/or receive a substitute MUMV (or, MUMVs) to replace a failing MUMV in the UWTT. A UWTT, in an example such as this, can remove a failing MUMV from the UWTT and replace that failing MUMV, in the UWTT, with the substitute MUMV(s).

As previously described, in embodiments performing optional operations of method 500, such as 512-516, a UWTT (e.g., one or more MUMVs included in a UWTT) UWTS can communicate with a control center (or, centers), other MUMVs, and/or AUMVs to add and/or remove MUMVs from a UWTT. It would be apparent to one of ordinary skill in the art that at any of the operations of a method for MUMVs transporting parcels on a waterway, such as 500, including optional operations such as 512-516, can include the UWTT communication with a control center, AUMVs, and/or MUMVs in a UWTS to coordinate logistics of forming MUMVs in a UWTT, including adding, removing, and/or substituting MUMVs in a UWTT, and can include performing these operations (including such communications) at a source location of a UWTT, destination location of a UWTT, and/or while a UWTT is in transit, on a transport waterway.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising a first marine unmanned vehicle (MUMV):

receiving, at a source location of a transport waterway, a waterproof tote, the waterproof tote containing a parcel for transport to a delivery location, the waterproof tote configured to transport the parcel, via the transport waterway, with the waterproof tote immersed, at least partially, in water of the transport waterway, the source location comprising a land location for delivering the waterproof tote to the first MUMV, the delivery location comprising a land location for receiving the waterproof tote from the first MUMV;

coupling the waterproof tote to a tether, the tether coupled to the first MUMV, the tether having a buoyancy to float on the water of the transport waterway, the tether and the waterproof tote configured to couple the waterproof tote to the tether with the tether floating on the water of the transport waterway and the waterproof tote immersed, at least partially, in the water of the transport waterway, the first MUMV and the tether configured to tow the waterproof tote from the source location to the delivery location with the waterproof tote coupled to the tether and immersed, at least partially, in the water of the transport waterway; and, transporting, from the source location to the delivery location, the waterproof tote on the transport waterway by towing the tether with the tether floating on the water of the transport waterway and the waterproof tote coupled to the tether and immersed in the water of the transport waterway.

2. The method of claim 1, wherein the tether comprises a net, the net configured to float on the water of the transport waterway; and,
wherein the method the transporting the waterproof tote on the transport waterway comprises the first MUMV transporting the waterproof tote on the transport waterway by the first MUMV towing the tether and the net with the waterproof tote contained within the net.

3. The method of claim 1, wherein one of the waterproof tote and the parcel contained within the waterproof tote comprises an identification (ID) tag, the ID tag comprising one of an electronically readable ID tag and a visually readable ID tag; and,
wherein the method further comprises identifying one of the waterproof tote and the parcel using the ID tag.

4. The method of claim 1, wherein the method the first MUMV receiving the waterproof tote comprises the first MUMV receiving the waterproof tote from an aerial vehicle.

5. The method of claim 1, the method further comprising receiving the waterproof tote, from the first MUMV, at the delivery location, by an aerial vehicle.

6. The method of claim 1, wherein the method further comprises coupling a second MUMV to the tether; and,
wherein the method the transporting the waterproof tote from the source location to the delivery location comprises transporting the waterproof tote from the source location to the delivery location by the first and the second MUVM towing the tether, with the tether floating on the water of the transport waterway and the waterproof tote coupled to the tether and immersed in the water of the transport waterway.

7. The method of claim 6, the method further comprising de-coupling, from the tether, in response to a condition of one of the first and the second MUMV, while transporting the waterproof tote, on the transport waterway from the source location to the delivery location, the condition comprising one of a failure of the one of the first and the second MUMV and the combination of the first and the second MUMV towing the tether providing more power than required to tow the tether.

8. The method of claim 7, wherein the method further comprises, in response to the decoupling the one of the first and the second MUMV from the tether, coupling to the tether a third MUMV; and,
wherein the method the transporting the waterproof tote on the transport waterway comprises transporting the waterproof tote on the transport waterway by the first and the third MUVM towing the tether, with the waterproof tote coupled to the tether and immersed in the water of the transport waterway.

9. The method of claim 1, wherein the tether is further configured to couple a plurality of waterproof totes;
wherein the first MUMV and the tether are further configured to tow the plurality of waterproof totes coupled to the tether with waterproof totes, among the plurality of waterproof totes, immersed in the water of the transport waterway; and,
wherein the method the transporting the waterproof tote on the transport waterway comprises the first MUMV towing the tether, with the waterproof tote among the plurality of waterproof totes coupled to the tether, on the transport waterway.

10. An unmanned water transport system (UWTS) comprising:
a first marine unmanned vehicle (MUMV) configured to navigate in water of a transport waterway;
a tether coupled to the first MUMV, the tether configured to float on the water of the transport waterway; and,
a waterproof tote containing a parcel for transport from a source location to a delivery location, the waterproof tote configured to transport the parcel, via the transport waterway, with the waterproof tote immersed in the water of the transport waterway, the source location comprising a land location for delivering the waterproof tote to the first MUMV, the delivery location comprising a land location for receiving the waterproof tote from the first MUMV,
wherein the waterproof tote and the tether are further configured to couple the waterproof tote to the tether with the tether floating on the water of the transport waterway and the waterproof tote immersed, at least partially, in the water of the transport waterway; and,
wherein the first MUMV and the tether are further configured to transport the waterproof tote from the source location to the delivery location, via the transport waterway, by the first MUMV towing the tether with the tether floating on the water of the transport waterway and the waterproof tote, coupled to the tether and immersed, at least partially, in the water of the transport waterway.

11. The UWTS of claim 10, wherein the tether configured to float on the water of the transport waterway comprises the tether configured to float on the water of the transport waterway by means, at least in part, of a float coupled to the tether.

12. The UWTS of claim 10, wherein the UWTS further comprises a plurality of MUMVs coupled to the tether to tow the tether and the waterproof tote on the transport waterway, the first MUMV among the plurality of MUMVs;
wherein the UWTS further comprises a control center, the control center configured to receive a message indicating that the plurality of MUMVs has more power, in combination, than necessary to transport the waterproof tote; and,
wherein the control center is configured to, in response to receiving the message, direct a second MUMV, among the plurality of MUMVs, to decouple from the tether.

13. The UWTS of claim 10, wherein the waterproof tote comprises a mechanical latch, the latch configured to open and close to couple the waterproof tote to the tether at an attachment point of the tether.

14. The UWTS of claim 10, wherein the UWTS further comprises a control center, the control center configured to receive a message indicating that the first MUMV has insufficient power to tow the tether and the waterproof tote on the transport waterway, and, in response to receiving the message, direct a second MUMV to a location, on the transport waterway, of the first MUMV; and, wherein the first and second MUMV are configured to, in response to the second MUMV arriving at the location of the first MUMV on the transport waterway, couple the second MUMV to the tether to tow the tether and the waterproof tote on the transport waterway.

15. The UWTS of claim 10, wherein at least one of the waterproof tote and the parcel contained within the waterproof tote comprises an identification (ID) tag, the ID tag comprising at least one of an electronically readable ID tag and a visually readable ID tag.

16. The UWTS of claim 10, wherein the UWTS further comprises a plurality of MUMVs coupled to the tether to tow the tether and the waterproof tote on the transport waterway, the first MUMV among the plurality of MUMVs;

wherein the UWTS further comprises a control center, the control center configured to receive a message indicating that a second MUMV, among the plurality of MUMVs, has detected a failure associated with the second MUMV;

wherein the control center is further configured to, in response to receiving the message, direct a third MUMV to a location of the plurality of MUMVs on the transport waterway; and, wherein, in response to the third MUMV arriving at the location of the plurality of MUMVs on the transport waterway, the second MUMV is configured to decouple from the tether, and the third MUMV is configured to couple to the tether, to tow the tether and waterproof tote on the transport waterway.

17. The UWTS of claim 10, wherein the tether is further configured to couple a plurality of waterproof totes; and, wherein the first MUMV and the tether are further configured to tow the plurality of waterproof totes coupled to the tether with waterproof totes, among the plurality of waterproof totes, immersed in the water of the transport waterway.

18. The UWTS of claim 10, wherein the tether comprises a first coupler;

wherein the waterproof tote comprises a second coupler; and, wherein the waterproof tote and the tether further configured to couple the waterproof tote to the tether comprises waterproof tote and the tether further configured to mate the first coupler with the second coupler.

19. The UWTS of claim 10, wherein the tether comprises a net, the net configured to float on the water of the transport waterway and to contain, within the net, the waterproof tote for transport from the source location to the delivery location; and wherein the first MUMV and the tether configured to transport the waterproof tote via the transport waterway comprises the first MUMV and the tether further configured to transport the waterproof tote by towing the tether and the net with the waterproof tote contained within the net.

20. The UWTS of claim 19, wherein the net comprises a float, the float providing, at least in part, a buoyancy of the net to float on the water of the transport waterway.

* * * * *